April 9, 1968 G. FAGGIANO 3,377,454

THREADED QUICK COUPLING PUSHBUTTON HOLDER FOR MICROSWITCHES

Filed Sept. 26, 1966 2 Sheets-Sheet 1

United States Patent Office 3,377,454

Patented Apr. 9, 1968

3,377,454

THREADED QUICK COUPLING PUSHBUTTON HOLDER FOR MICROSWITCHES

Giuseppe Faggiano, Milan, Italy, assignor to AMF Electrica S.p.A., Milan, Italy, a corporation of Italy

Filed Sept. 26, 1966, Ser. No. 581,812
Claims priority, application Italy, Oct. 2, 1965, 5,899/65
1 Claim. (Cl. 200—168)

ABSTRACT OF THE DISCLOSURE

A pushbutton holder for microswitches characterized in that it possesses a U-shaped configuration having a pair of side wall shanks which enclose the microswitch, the shanks being provided with inwardly directed bosses adapted to be snap-coupled into the ends of the conventional fastening openings of the switch housing, the holder having an apertured turret for receiving a pushbutton and said turret being aligned with the actuating member of the switch.

This invention relates to a pushbutton holder for microswitches.

The pushbutton holders for microswitches in use at present require generally for their fastening to the microswitch the use of connecting members which, besides weighing on the total cost of the microswitch, make the fastening operation of the pushbutton holder comparatively time consuming and difficult.

Coupling pushbutton holders have been already suggested, but they still involve additional operations on the microswitch, prior to and after the coupling of the pushbutton holder.

It is the object of this invention to eliminate the above mentioned disadvantages of the prior art pushbutton holders for microswitches by providing a quick coupling pushbutton holder which does not require the use of connecting members and additional operations on the microswitch, prior to and after the application of the pushbutton holder.

More particularly the pushbutton holder for microswitches according to the invention is characterized in that it has a U shaped configuration, the two shanks of which enclosing the microswitch each carries two bosses adapted to be snap coupled, owing to the resiliency of the material from which said pushbutton holder is made, into the conventional fastening holes in said microswitch.

In order to mount the pushbutton holder on the microswitch it is sufficient to put it straddling on the microswitch, after the pushbutton has been inserted in its associated seat, and to cause the pushbutton holder to slide with respect to the microswitch until the bosses on the shanks of the U snap into the fastening holes in the microswitch.

The invention will be better understood from the following detailed description of an embodiment thereof, referring to the accompanying drawings, wherein.

Figure 2:
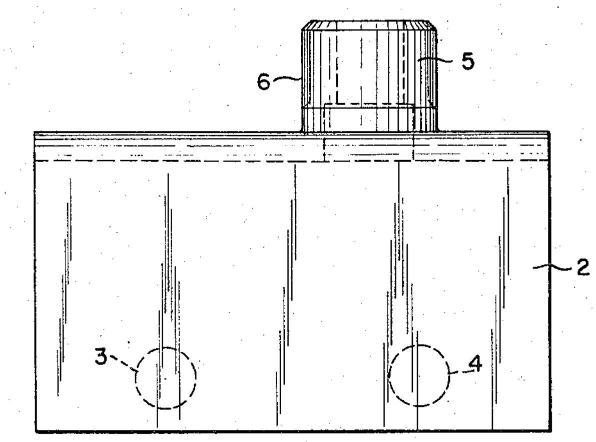
FIG. 2 shows the pushbutton holder in an elevational view.
Figure 3:
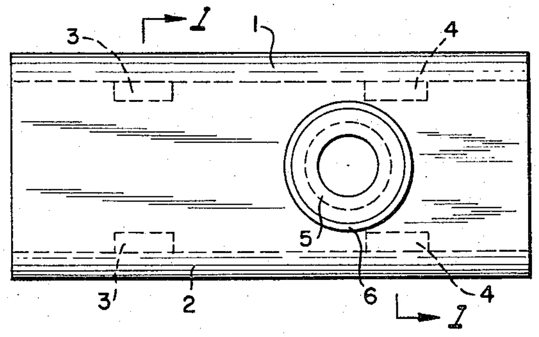
FIG. 3 shows the pushbutton holder in a top plan view.
Figure 6:
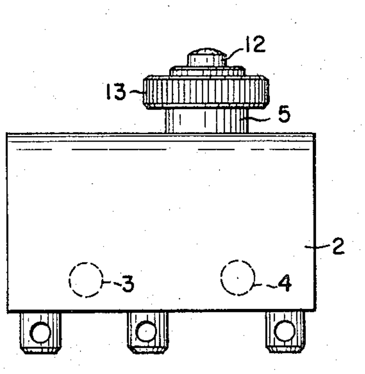
Figure 5:
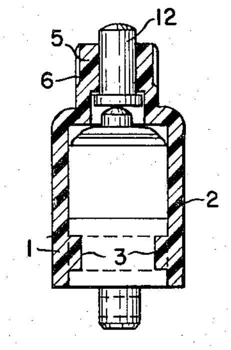
Figure 4:
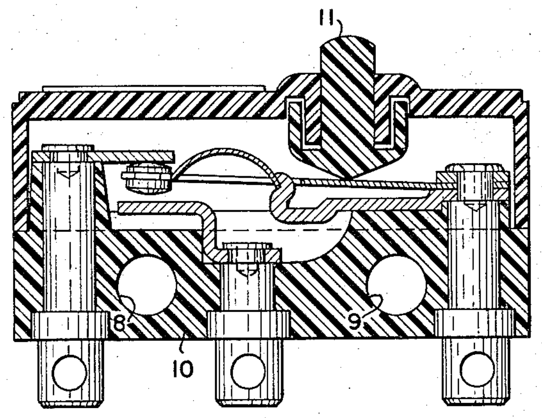
FIG. 4 shows a microswitch intended to have a pushbutton holder according to the invention mounted on it, in a longitudinal sectional view.

FIG. 5 shows, to a reduced scale with respect to that of FIGS. 1 to 4, in a cross sectional view the pushbutton holder according to the invention mounted on a microswitch according to FIG. 4, the microswitch being shown in an end elevational view; and FIGURE 6 shows in a side elevational view, to the same scale as FIG. 5, the pushbutton holder mounted on the microswitch, with a fastening ring nut applied to the threaded turret of the pushbutton holder.

Figure 1:
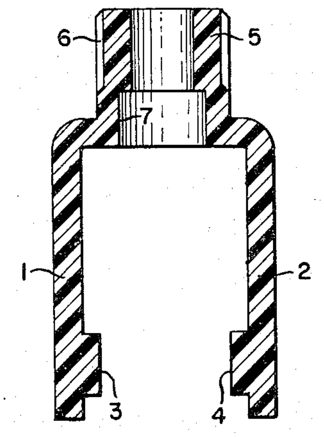
FIG. 1 shows a pushbutton holder according to the invention in a cross sectional view taken along line 1—1 in FIG. 3.

Referring first to FIGS. 1 to 3, the pushbutton holder has a U shaped configuration with the two shanks 1 and 2 each carrying two bosses 3, 4 with slightly different diameters. In its upper portion the pushbutton holder has a turret 5 which is threaded outwardly at 6 and inside which a seat 7 for the pushbutton is provided.

The pushbutton holder described is molded integral in a thermoplastic material.

In FIG. 4 a microswitch is shown which can be of a conventional type, adapted to have the pushbutton holder in FIGS. 1 to 3 applied on it. The parts of the microswitch which form no part of the present invention will not be described for sake of simplicity. The only parts important for the present invention are the holes 8 and 9 in the housing 10 of the microswitch and the plunger 11 intended to be operated by the pushbutton 12 mounted in the pushbutton holder (see FIGS. 5 and 6).

In FIGS. 5 and 6 the pushbutton holder is seen mounted on the microswitch. The bosses 3 and 4 are received in corresponding holes 8 and 9 in the housing 10 of the microswitch. The pushbutton 12 is received with its head in the seat 7 inside the turret 5 and abuts the top of the plunger 11.

The microswitch is secured to a wall in the conventional manner with the aid of a ring nut (FIG. 6) which threadedly engages threads 6 on the turret 5.

In order to mount the pushbutton holder on the microswitch the pushbutton 12 is inserted in the seat 7 and the pushbutton holder is put straddling the microswitch by causing the shanks 1 and 2 with their bosses 3 and 4 to slide on the outer wall of the microswitch taking advantage of the resiliency of the material from which the pushbutton holder is made for slightly spreading the shanks 1 and 2 apart until the bosses 3 and 4 snap into the holes 8 and 9 and the shanks take because of their resiliency their original form. In this manner the pushbutton holder is firmly secured to the microswitch without requiring connecting members and the fastening operation is extremely quick. A further advantage of the pushbutton holder according to the invention is that it is much simple to manufacture.

I claim:

1. A pushbutton holder for a microswitch of the type having a top provided with an actuating plunger and a pair of parallel sides provided with a pair of spaced-apart openings extending through both of said sides, characterized in that said holder has a U-shaped configuration including a pair of spaced-apart side wall shanks and an apertured cylindrical turret extending outwardly from the top wall thereof for receiving a pushbutton, said side wall shanks being provided with two pairs of inwardly directed bosses, the bosses of each pair being aligned and being snap-coupled into opposite ends of said openings due to natural resiliency of the material of said holder when the latter is assembled over said microswitch with the side wall shanks engaging said sides and the turret being aligned with said actuating plunger.

References Cited

UNITED STATES PATENTS

| | | | |
|---|---|---|---|
| 2,511,271 | 6/1950 | Kaminky et al. | 200—172 |
| 2,824,197 | 2/1958 | Bolek | 200—172 |
| 3,121,778 | 2/1964 | Sander et al. | 200—172 |
| 3,189,703 | 6/1965 | Chapin et al. | 200—168 |

FOREIGN PATENTS

| | | |
|---|---|---|
| 1,351,538 | 12/1963 | France. |

ROBERT K. SCHAEFER, *Primary Examiner.*

H. O. JONES, *Assistant Examiner.*